Jan. 14, 1941. G. V. McCAULEY 2,228,395
FURNACE STRUCTURE
Filed Aug. 26, 1938 2 Sheets-Sheet 1
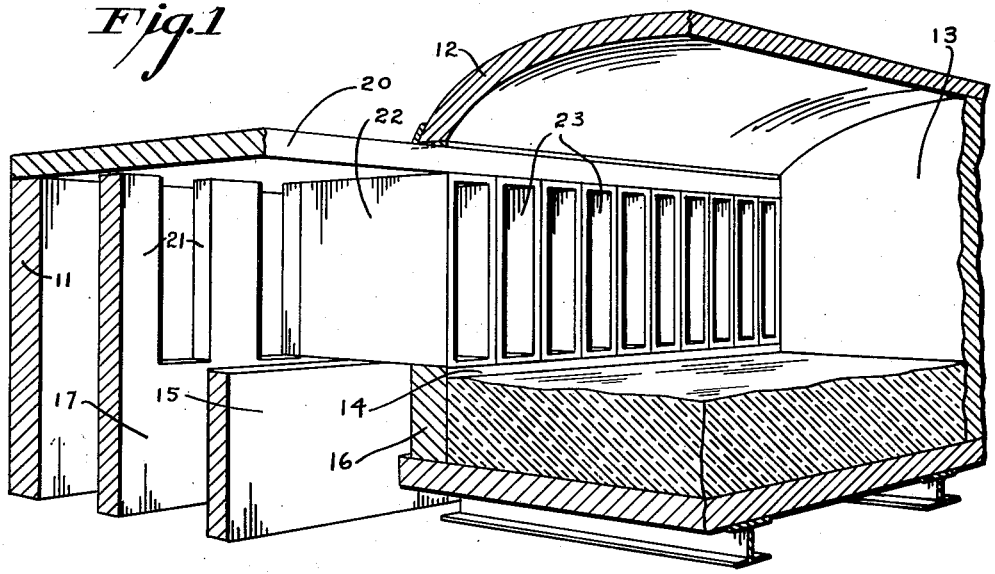
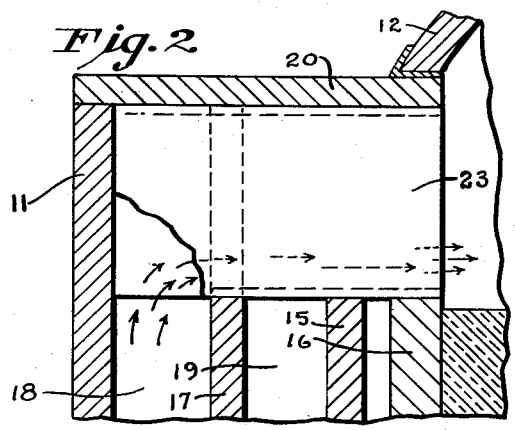
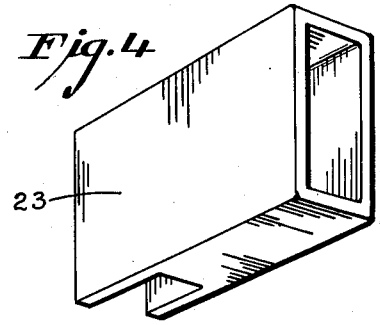
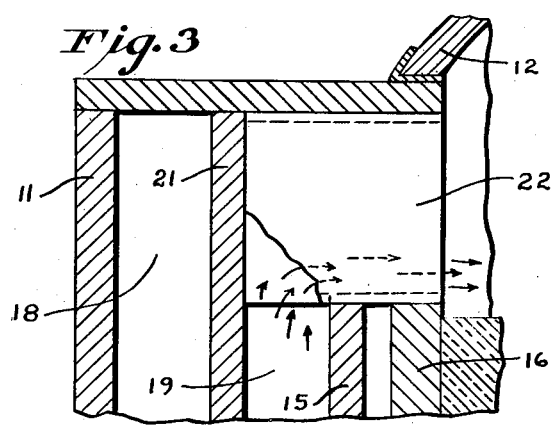
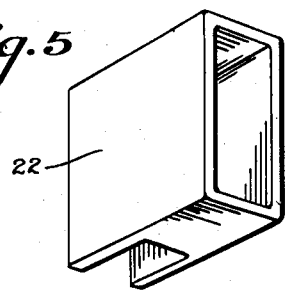
INVENTOR.
GEORGE V. McCAULEY
BY Dorsey, Cole + Garner
ATTORNEYS.

Jan. 14, 1941.   G. V. McCAULEY   2,228,395
FURNACE STRUCTURE
Filed Aug. 26, 1938   2 Sheets-Sheet 2
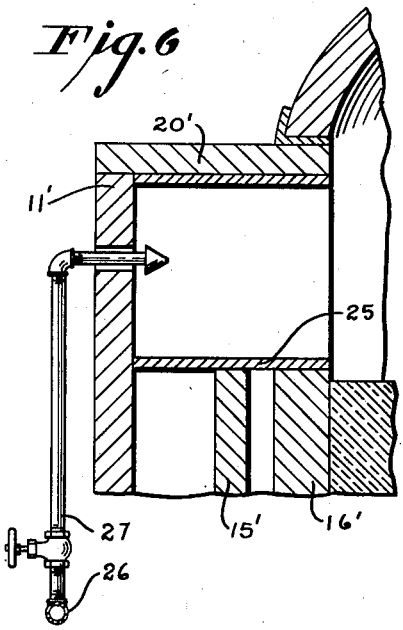
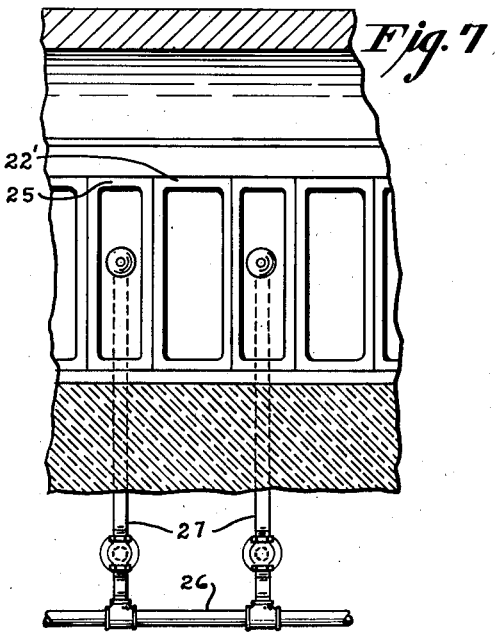
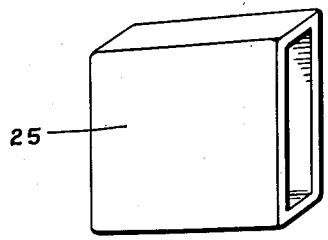
INVENTOR.
GEORGE V. McCAULEY
BY Dorsey, Cole & Garner
ATTORNEYS.

Patented Jan. 14, 1941

2,228,395

UNITED STATES PATENT OFFICE 2,228,395

FURNACE STRUCTURE

George V. McCauley, Corning, N. Y., assignor to Corning Glass Works, Corning, N. Y., a corporation of New York Application August 26, 1938, Serial No. 227,000

9 Claims. (Cl. 49—54)

My invention relates to furnace structures and particularly to narrow tank glass melting furnaces of the regenerative type.

In the design and construction of narrow tank furnaces special attention must be given to the method of feeding fuel and combustion supporting air to the combustion chamber if efficient operation is to be obtained.

The principal object of my invention is the reduction of radiation losses from the melting and combustion chambers and the promotion of rapid combustion in a short distance so as to obtain efficient firing, even in the combustion chambers of narrow tank glass melting furnaces.

Another object is compact furnace structures of simple design.

Among its features my invention embodies the use of a plurality of conduits or tiles which serve as air and fuel intake ports and which are so arranged as to form the entire side-wall of the combustion chamber of a tank furnace. By use of such an arrangement the incoming air and fuel streams are so distributed that efficient combustion of the mixture occurs along the whole side of the combustion chamber.

Another feature consists in locating the regenerator assemblies in close proximity to the side-wall of the melting chamber and making them of the height of the combustion chamber so that radiation losses through the side-walls of the furnace are greatly reduced.

A further feature includes a simple form of two stack checker assembly in which the stacks are separated by a dividing wall of simple configuration and which serves as end closures for those conduits which feed fuel to the combustion chamber and which has openings through which those conduits which feed combustion supporting air pass.

A modifying embodiment of my invention includes the principal features above outlined incorporated in furnace structures adapted for use of natural gas or oil as the heating medium.

In the accompanying drawings

Fig. 1 is a sectional view, in perspective, of a furnace structure embodying my invention;

Fig. 2 is a sectional view, in elevation, of a part of the structure shown in Fig. 1, more fully illustrating the path between the outside checker stack and the combustion chamber;

Fig. 3 is a view similar to Fig. 1 more fully illustrating the path between the inside checker and the combustion chamber;

Figs. 4 and 5 are perspective views of the air and fuel conducting units respectively;

Fig. 6 is a fragmentary sectional elevation illustrating a modified form of the invention;

Fig. 7 is a side elevation of Fig. 6; and

Fig. 8 is a perspective view of the form of unit employed in the structures illustrated in Figs. 6 and 7.

In the form of my invention illustrated in Figs. 1-5 the outer checker wall 11 is solid throughout its height and extends to the bottom level of a roof arch 12 over the combustion chamber 13 and melting tank 14. The inside checker wall 15 is on the other hand solid throughout its height and extends to the top level of the melting tank wall 16. An intermediate wall 17 divides the space between walls 11 and 15 into air and gas checker flues 18 and 19 respectively and is also solid to the height of walls 15 and 16. From this height to the checker roof 20 the wall is of comb-like configuration the teeth 21 serving as end walls for tile-like gas conduits 22 resting on the walls 15 and 16 respectively.

In a similar fashion air conduits 23 rest on the walls 15 and 16, but occupy the spaces between teeth 21, closing these spaces to the gas flue 19 and providing direct passages between the air flue 18 and the combustion chamber 13. As will be understood, the oppositely disposed side of the furnace structure is similar to that shown. With the foregoing arrangement of air and gas fuel intake passages along the entire side wall of the furnace an intimate intermixture of gas and air is produced.

In the application of the invention to a furnace structure which employs natural gas or fuel oil, a single flue checker such as illustrated in Figs. 6 and 7 may be employed. In such structure walls 11', 15', 16', and a roof member 20', similar to those already described, are employed.

The air intake conduits 22' are similar to the gas intake conduits 22 (Fig. 5), whereas the gas or fuel oil intake conduits 25 are similar to but materially narrower than conduits 22 and 22' and do not have an opening leading to the checker chamber.

Suitably valved branches 27 of a fuel supply line 26 pass through wall 11' into communication with the respective conduits 25.

What is claimed is:

1. In a glass melting furnace, a glass melting tank having a cover thereover, air and fuel flues adjoining one another extending along the entire length of said tank and extending to the height of the cover thereof, a series of box-like refractory units extending under the edge of the cover and arranged alongside one another along the length of said tank but at right angles thereto, each alternate one of which affords a passageway between the area immediately above said tank and the air flue, and the remaining units of which afford passageways between the area immediately above said tank and the fuel flue.

2. In a regenerative glass melting furnace, a glass melting tank having an end wall shaped to conform to an arch cover thereof, air and fuel flues adjoining one another extending along substantially the entire length of the melting tank and to a height corresponding to that of the lowest point of the end-wall of said tank, and a side-wall extending between the top of the side wall of the tank and the tank cover comprising a series of tiles arranged alongside one another in a single horizontal row and certain of said tiles establishing communication between one of said flues and the area immediately above said tank, and other of said tiles establishing communication between the other of said flues and such area.

3. In a glass melting furnace, a melting tank, fuel and air flues adjoining one another arranged alongside one another and alongside the full length of the melting tank respectively, side-walls extending upwardly from the side-walls of said tank comprising a series of hollow refractory members arranged adjacent one another, certain ones of which are arranged to afford direct passageways between the fuel flue and the combustion area above said tank and the remainder of which are arranged to afford similar passageways between the air flue and such area.

4. In a furnace structure a material melting tank, side-walls extending upwardly from the top of side-walls of said tank and each consisting of a series of box-like refractory units arranged in the same horizontal plane, certain ones of which serve as fuel intake ports and the remaining of which serve as combustion air intake ports, and a crown over said melting tank in part supported by said units.

5. In a glass melting furnace including a glass melting tank, a row of box-like refractory units adjoining one another arranged in association with the tank, each alternate unit of which is adapted to supply fuel to the combustion area above the tank and the remaining units of which are adapted to supply air to such area.

6. In a glass melting furnace including a covered glass melting tank, a row of box-like refractory units adjoining one another arranged on each of two oppositely disposed side-walls of the tank and adapted to support the cover, each alternate unit in a row being adapted to supply fuel to the area above the tank and the remaining units being adapted to supply combustion supporting air to such area.

7. A glass melting furnace comprising a refractory receptacle adapted to contain molten glass, a refractory arch spanning said receptacle, wall structures filling the spaces between said receptacle and said arch, two of said oppositely disposed walls each consisting of a series of box-like refractory units placed wall to wall, said units being open on their opposing sides and alternate units being connected to sources of air and fuel.

8. In a furnace structure including a covered receptacle adapted to contain molten glass, the end walls closing a space between the ends of said receptacle and its cover, fuel and combustion air supply flues arranged alongside of said receptacle, a series of box-like refractory units adjoining one another arranged wall to wall and occupying the entire space surrounded by said end walls, said receptacle and the cover, each alternate one of the units of said series being adapted to establish communication between the air supply flue and the space between said receptacle and its cover and the remaining of said units being arranged to establish communication between the fuel supply flue and the last defined space.

9. In a furnace structure including a rectangular receptacle for molten glass and a cover over the receptacle spaced therefrom, flues for supplying fuel and combustion supporting air to the area between said cover and receptacle, a series of box-like refractory units arranged adjacent one another and together being of the same length as that of the receptacle and the units individually being of such height that the space between said receptacle and cover is closed by them, each alternate unit establishing a communication between the area under said cover and one of said flues, and the remaining units establishing communication between such area and the other of said flues.

GEORGE V. McCAULEY.